Patented June 18, 1940

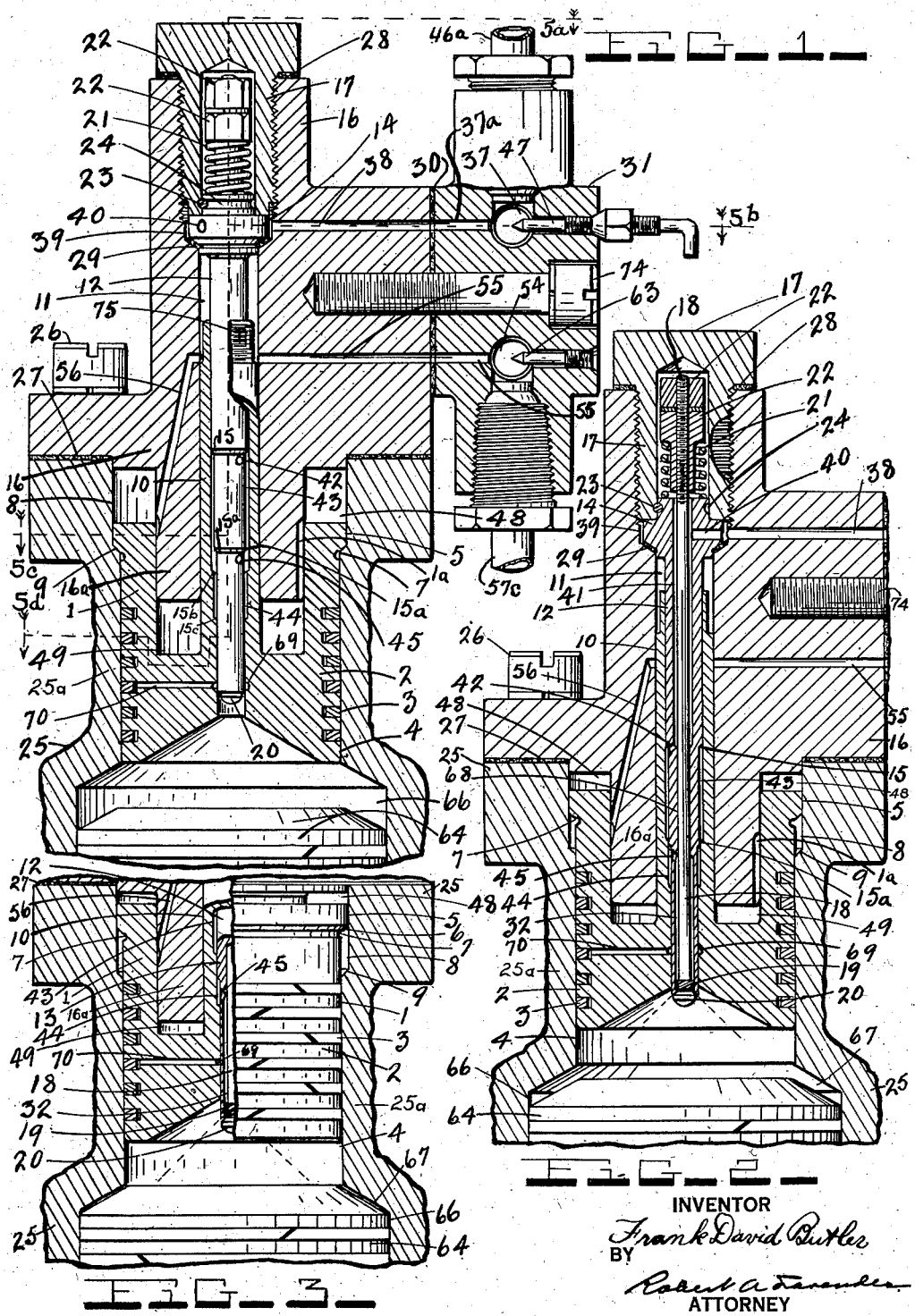

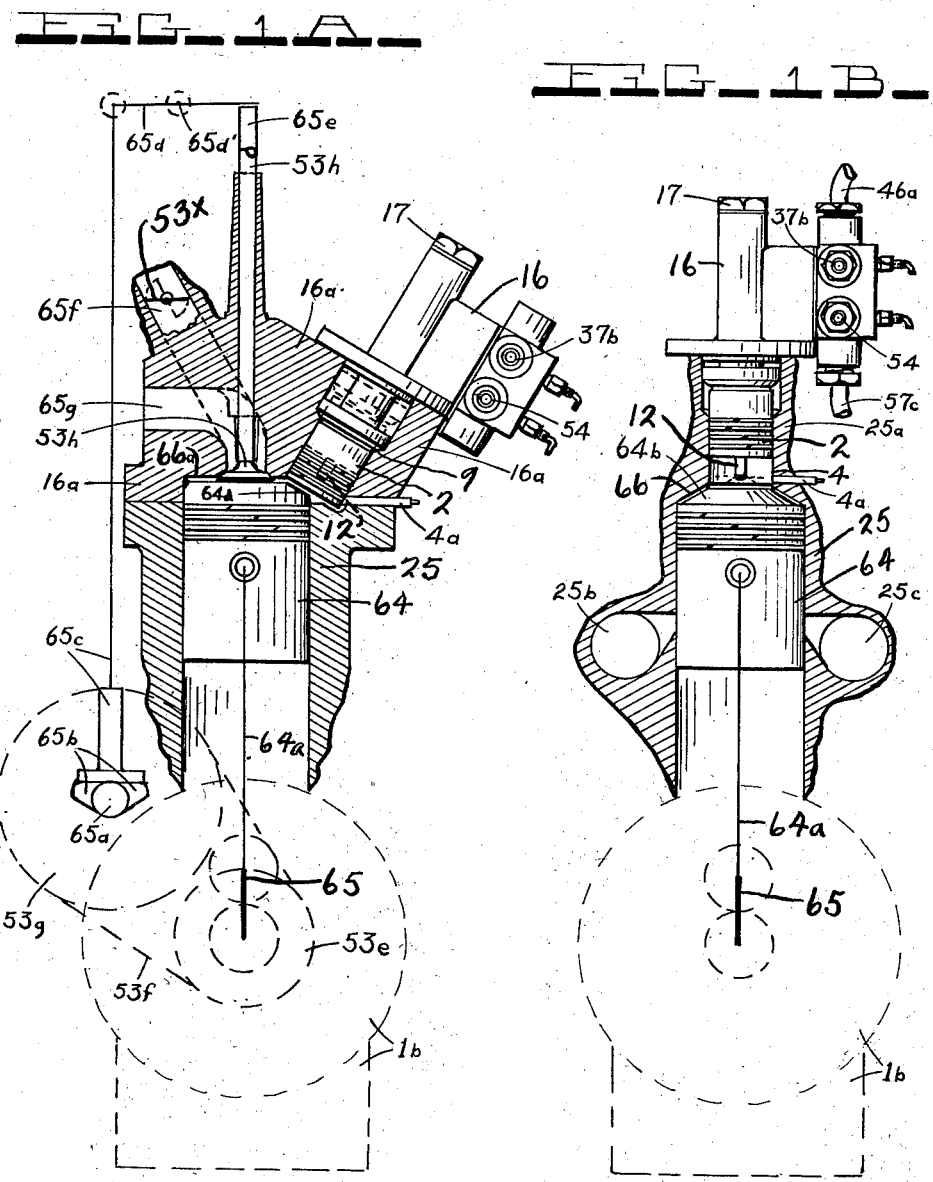

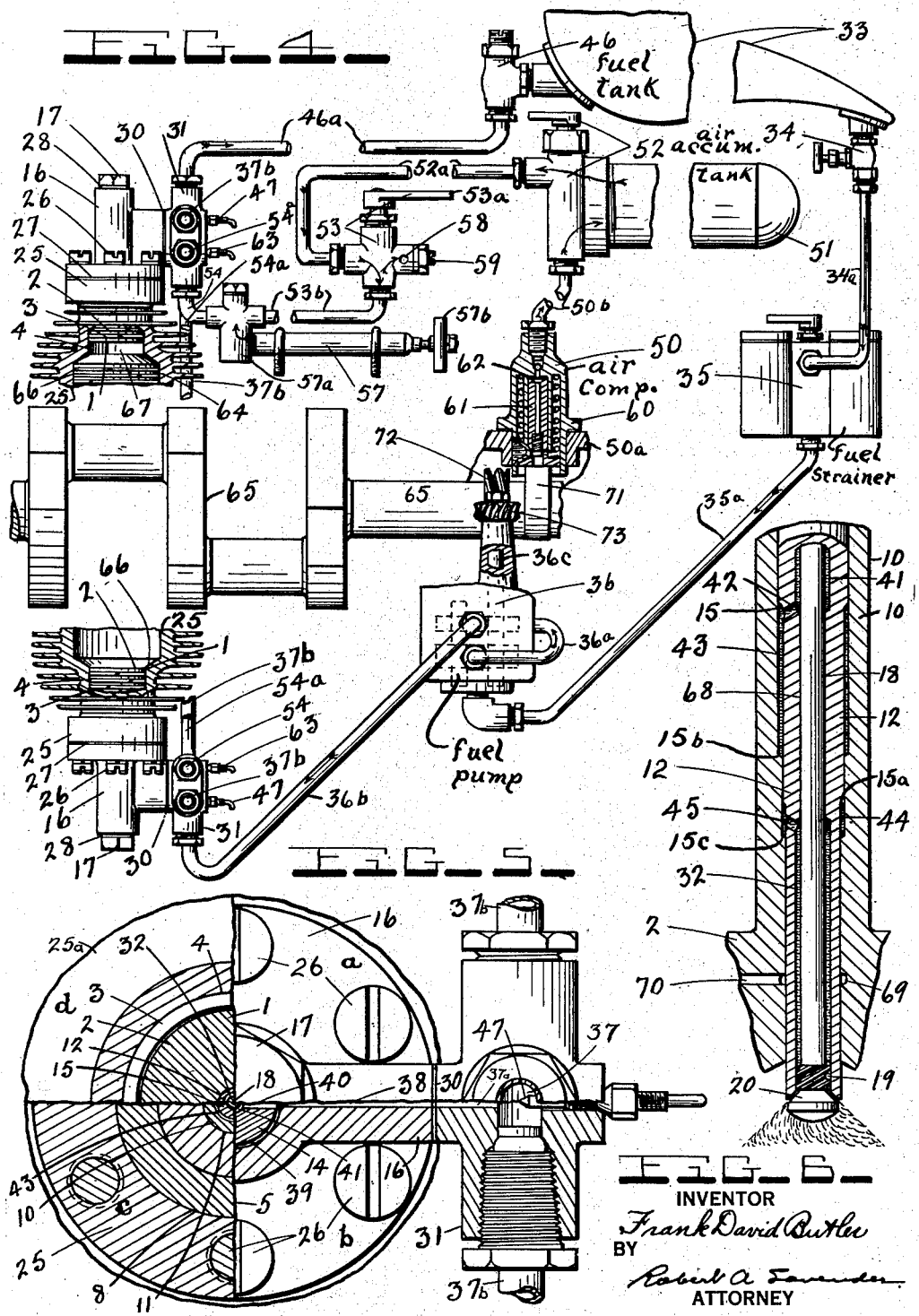

2,204,570

UNITED STATES PATENT OFFICE 2,204,570

INTERNAL COMBUSTION ENGINE METHOD AND APPARATUS

Frank David Butler, United States Navy

Application August 18, 1937, Serial No. 159,690

10 Claims. (Cl. 123—139)

(Granted under the act of March 3, 1883, as amended April 30, 1928; 370 O. G. 757)

My present invention relates to combustion engines, and has been beneficially adapted by me to the compression ignited and spark plug ignited types of the two, as well as four, cycle methods of operation. In the compression ignited engines the air under compression in the compression stroke must be raised to a pressure affording heat sufficient to ignite the fuel injected therein. I have found that, through one or more contributing causes liable to occur and reoccur, such compression may, due to wear and other causes, be insufficient to efficiently ignite such fuel, or insufficient to efficiently utilize the whole of the charge of fuel heretofore injected. In either instance a waste of fuel has resulted, which, among other objectionable conditions, causes an exhaust of unburnt fuel or retarded combustion, and no means have been provided for readily varying the compression maximum as well as the volume of fuel, for each combustion, proportionate to the compression pressure which I have found essential in the practical solution of the above indicated problems.

In the spark plug ignited engines greater such waste has heretofore existed than in the compression ignited types, due to the greater cost of the fuel, which waste imperiled engine lubrication by diluting the crankcase oil; the lack of complete combustion of the fuel, during the power stroke of, and against, the power piston; the varying factors of volume of air and fuel in each combustion and the lack of automatic means for maintaining such factors relative to the compression pressure of the air and fuel volumes to be successively ignited; the heretofore unsuppliable need for ready means for varying the compression pressure of the engine while in operation; the heretofore unsuppliable need in spark plug ignited engines, which my invention supplies, of an improved method of and means for their operation such that in the compression cycle atmospheric air is compressed in a closed volume to a predetermined degree less than the maximum compression, injecting fuel under pressure into said air in said closed volume by the direct employment of the force of such compressed air above said predetermined degree; igniting the mixed air and fuel, which increases the pressure, within the confined volume; and by the increased pressure injecting further fuel into the closed burning volume whose combustion affords the power utilizable in the power cycle.

The solution of these major problems in each such types of engines, with their many minor constituent problems, has been long and vainly sought by many in this art.

The major concept of my present invention is the solution of each of said problems, and its incidental or associated concept is the provision of simple, durable, efficient and relatively inexpensive means for its practical and commercial accomplishment in each type of combustion engine.

More specific concepts of my invention contemplate (a) the provision of a supplemental piston, associated with each power piston compressing the air, and which is moved by, and proportionate to, the compression and combustion pressures occasioned within its associated power cylinder; (b) the provision of means whereby each supplemental piston controls the time and volume of each fuel charge, from nothing up to maximum, that may be injected into its associated power cylinder at each injection; (c) the provision of means whereby each supplemental piston in its receding movement cuts off the injection of fuel to its associate power cylinder as the combustion pressure lowers by the receding of its associated power piston, and in such receding movement it restores to its associated power piston the power it received therefrom, and from the combustion pressure, in its movement from normal position; (d) the provision of means whereby the fuel is injected into each cylinder by means extending through each of its respective supplemental pistons and which extending means may be relatively stationary and may inject the fuel as a solid or as a spray of mixed air and fuel; (e) the provision of means (b) such that it may be manually adjusted to different maximum volumes of such injected fuel at different adjustments; (f) the provision of means for effecting very beneficial turbulence of the compression air within the combustion space of each associated pair (comprising an auxiliary piston and power piston) prior to, during and succeeding the injection therein of the fuel charge; (g) the provision of means for utilizing the foregoing means with a lesser compression pressure insufficient to ignite fuel and a spark plug for combusting the fuel charge to each power cylinder; (h) the provision of an engine which may readily and conveniently be changed from a compression ignited to a spark plug ignited engine, and vice versa; and (i) the provision of methods, means and combinations of acts and elements described herein, comprising new and useful entities which practically, commercially, efficiently and economically practice, in the form and manner found by me thus far in the development of my invention to be most advantageous in each of the foregoing, and other, respects, which will more clearly appear and be understood by those skilled in this art from the accompanying drawings, the following description, and the appended claims.

It will be readily appreciated by those skilled in this art, after understanding my invention, that various changes may be made in the means disclosed herein which will produce the same result in substantially the same way without digressing substantially from my inventive concept or sacrificing any of its outstanding inherent advantages, and that any number of cylinders may comprise one engine.

With reference to the drawings:

Fig. 1 is a central vertical section through a portion of one of the cylinders of an internal combustion engine designed as per my invention, and illustrates the position of the various moving elements of the cylinder unit just prior to the movement from normal position of the auxiliary piston;

Fig. 1A is a diagrammatic view of a typical four-cycle engine and the application of my invention thereto;

Fig. 1B is a diagrammatic view of a typical two-cycle engine and the application of my invention thereto;

Fig. 2 is a like fragmentary view of parts illustrated in Fig. 1, showing the positional change of the various moving elements of the cylinder unit attained at the commencement of the fuel injecting period;

Fig. 3 is a like fragmentary view of portions of the essential parts of Figs. 1 and 2, but illustrating the engine piston on its limit of travel, the auxiliary piston at practically the outward end of its travel, and said pistons in their relative positions when practically all of the charge of the combustible fuel mixture has been discharged into the combustion space and has commenced to burn;

Fig. 4 is a diagrammatic view of the liquid fuel and compressed air supply systems;

Fig. 5 is a plan view on lines 5a—5b—5c—5d of Fig. 1, quarter $a$ being on line 5a, quarter $b$ on line 5b, quarter $c$ on line 5c, and quarter $d$ on line 5d.

Fig. 6 is an enlarged fragmentary view of the inner portions of the automatic fuel atomizing and injecting elements in their relative position illustrated in Fig. 3.

In Fig. 1A the water cooling spaces are not shown in the walls about pistons 2 and 64. In Figs. 1, 1A, 2 and 3 the air cooling fins or water cooling spaces are broken away from the walls about pistons 2 and 64.

In the drawings, in which the same reference characters indicate the same parts, Figs. 1A, 1B, diagrammatically represent respectively the applications of my present invention to the typical four and two cycle types of combustion engines.

In Fig. 1A the usual power piston 64 of each cylinder 25 of the engine is connected by the usual connecting rod 64a to its respective crank of crank shaft 65. The shaft 65 has fixed thereon the usual connection with cam shaft 65a comprising gear 53e, chain 53f and larger gear 53g. Cam shaft 65a is provided with a pair of cams 65b, for each cylinder 25 comprising the engine, each of which cams operates a rod 65c connected to a lever 65d fulcrumed at 65d'. One of the levers 65d operates the inlet valve and its stem 65e and the other the exhaust valve and its stem 53h of each cylinder 25. The air, taken in through the inlet 65f and its then open inlet valve 65e is, upon the closing of the inlet valve, compressed by piston 64 to a pressure and associated temperature sufficient to ignite the fuel. Such pressure acts also on the head of, and proportionately moves outward, the supplemental piston 2, in its bore 4 of cylinder portion 25a, from its normal position, in which it contacts with shoulder 9 near the outer end of bore 4. The surface of and opposite the head of piston 2 is, preferably at all times, subjected to a pressure medium, supplied through pipe or manifold 54. Slidable through the supplemental piston 2 is a hereinafter described fuel injector comprising a tubular stem 12 and rod 18, Figs. 1, 2, 3 and 6, supplied with fuel by pipe or manifold 37, Fig. 1. As power piston 64 nears its outer dead center, in its compression stroke, the compression pressure increases, but in the compression ignited adaptation of my invention such increase is to the point where its associated temperature will ignite fuel. The compression pressure, in its higher ranges, in all adaptations of my invention, overcomes the lesser pressure from pipe or manifold 54 normally holding the surface 6 of shoulder 5 of supplemental piston 2 in its normal position against shoulder 9, Fig. 1, and moves piston 2 outward. The undercut portion 7, Figs. 2, 3, in the skirt of piston 2 adjacent surface 6 of its shoulder 5 renders machining of surface 6 more expeditious. Such movement of piston 2 opens the fuel injection passage, from the injector 12, 18, proportionate to the difference between the lesser pressure and the compression pressure between and against the heads of pistons 2 and 64. Thereupon fuel is injected through such passage into and ignites in the compression space in cylinder bore 4 between the heads of pistons 2 and 64, and between the head of piston 64 and the wall 66 forming the head of power cylinder 25. Such combustion momentarily increases the pressure and temperature in said space. This increased pressure further moves outward the piston 2 and increases the period of time, proportionate to the magnitude of such pressure, during which the injection passage is held open and the injection prolonged within the volume of fuel available for each injection. This movement of piston 2 tends to increase the pressure of air upon piston 2 from pipe or manifold 54. Upon the receding of piston 64 such pressure progressively lowers, and when the same becomes less than the pressure on the opposite side of piston 2, the latter piston is, by said pressure differential, moved toward and against shoulder 9 to progressively close said injection passage and preclude further injection until the next compression stroke. Near the end of the power stroke of piston 64, motivated by the igniting fuel, the exhaust valve 53h opens, permitting the combustion products to exhaust through outlet 65g. This return movement of piston 2 tends to increase for a time the working pressure against piston 64 before the exhaust valve 53h opens, the increase being to the extent of the power required to displace piston 2.

In Fig. 1B, the same function results are attained, as described above as to Fig. 1A, the structure being the same, except that the inlet and exhaust valves of Fig. 1A are dispensed with by the skirt of piston 64 acting as valves keeping the inlet and exhaust openings, 25b, 25c, respectively, in the walls of cylinder 25, closed until opened by the head of said piston 64 when it uncovers them, and the inlet air is subjected to the required pressure before being admitted into the cylinder, as is usual with two cycle engines.

This understanding of the fundamentals of my present invention will facilitate the appreciation of the following description of the mechanism I have devised, selected and associated for its practical and commercial embodiment.

In a bore 4 of a portion 25a of each cylinder 25, forming an engine, I provide a movable supplemental piston 2, at a point in the cylinder where the head of the piston 2 is subjected to, and moved outward or away from the head of power piston 64 in cylinder 25 by the compression periodically occasioned by piston 64 in the usual manner. For highest compression I mount the piston 2 with its head parallel and juxtaposed to at least a portion of the head of power piston 64 when the latter is at the end of its compression stroke. Piston 2 is provided with a skirt extending to its end opposite the head of piston 2 and having a plurality of piston rings 3, which are slidable in the bore 4 of a supplemental cylinder formed in a projecting portion 25a of power cylinder 25. At its outer end the cylinder bore 4 is of enlarged diameter 8 for a distance affording accommodation for the extent of movement of piston 2, and which enlarged diameter has extended therein an annular projection 5 from the outer terminal of the skirt of piston 2, to limit the movement of piston 2 within the bore 4 of supplemental cylinder 25a. Centrally from within the skirt end of piston 2 extends a tubular projection 10 whose bore extends through the head of piston 2. Air or other inert fluid is maintained, as hereinafter described, under the required pressure against the skirt end of piston 2, and the fuel injection means extends into the bore of projection 10 of piston 2.

To the outer end of each supplemental cylinder 25a is secured, by screws 26, a head 16, with gasket 27 to maintain the seal between such parts. Vertically through head 16 extends a cylindrical bore 11, in whose lower portion slidably fits the projection 10 of piston 2. The outer end of projection 10 is of reduced diameter and provided with screw threads 75 to facilitate grinding in of shoulders 6 and 9 with head 16 in place. At a distance above the threaded end 75 of the projection 10, the bore 11 is enlarged, which enlargement extends through the outer end of head 16. The bottom of the enlargement is provided with a removable seat 29, Figs. 1, 2, against which is normally seated a hollow disc 14 whose diameter is less than that of the enlargement of bore 11. From one side of disc 14 extends an integral tubular stem 12 slidably extending substantially the length of the bore of tubular projection 10 of piston 2. Through the bore of stem 12 extends a rod 18, Figs. 2, 6, having helical projections 19 on its lower end and whose outer surfaces may contact with the inner surface of the inner end of the bore of said stem 12. The inner end of rod 18 extends beyond the inner end of said stem 12 where it is provided with a valve head 20, of a diameter substantially that of the stem 12, the head 20 having a valve seat, preferably conical, seating against the inner end of stem 12. The outer end of rod 18, extending beyond disc 14, is threaded and provided with lock nuts 22 confining a spring 21 between the disc 14 and the nuts 22. The enlarged portion of bore 11 of head 16 is screw threaded and closed by a hollow screw 17 and a gasket 28, the nuts 22 and spring 21 loosely occupying the hollow of screw 17, while the inner end of screw 17 contacts with and holds disc 14 against seat 29, a retainer pin 23 occupying juxtaposed portions of a groove 24 in screw 17 and a portion of disc 14 for conveniently removing and replacing the latter with its stem 12, and rod 18.

A fuel passage 38, Figs. 1 and 2, leads laterally through a side of head 16 into the space 39 between disc 14 and the enlarged portion of bore 11 in head 16 and discharges its fuel into said space and thence into a plurality of fuel passage openings 40 extending angularly through the periphery of disc 14 and into the fuel passage 41 between the bore of the valve-stem 12 and rod 18.

Thence, the fuel, preferably oil in the compression ignited, and oil or gas in the spark plug ignited, adaptation of my invention, passes to the bottom of fuel passage 41, thence through openings 42 through said stem 12 at or near the bottom of fuel passage 41 and the inner edge of a shoulder 15, Figs. 1, 2, 6, which shoulder 15, as well as the bottom of passage 41, is formed by reducing the external and internal diameters of stem 12 such that a portion of said stem 12 slidingly fits rod 18. Inward from shoulder 15 the stem 12 is further reduced in diameter to a second shoulder 15a at the inner edge of said reduction in diameter of stem 12. The bore of tubular projection 10 of piston 2 extends of uniform diameter, in the instance shown in the drawings, from its outer end 75 inward to a point inward from shoulder 15a, when piston 2 and its tubular projection 10 are in the normal position shown in Fig. 1, at which point its said bore is reduced in diameter to form a shoulder 15b, said reduced diameter affording a sliding fit with the external diameter of tubular stem 12 between said shoulders 15, 15a. At a point inward from shoulder 15b the internal diameter of the bore of tubular projection 10 of piston 2 is further reduced to form shoulder 15c, which reduced diameter affords a sliding fit on the further reduced diameter of stem 12. Commencing substantially at said shoulder 15a of stem 12 the internal diameter of stem 12 is increased to afford an annular fuel passageway 32, which extends inward to head 20 of rod 18. At the outer end of passageway 32 the wall of stem 12 is provided with an opening 45.

In the normal position of the parts shown in Fig. 1, the fuel, under pressure, passing through the opening 42 enters annular passageways 43 and 44, extending respectively between shoulders 15, 15c and thence through opening 45 to annular passageway 32, Figs. 2, 3 and 6, and fills said passageways, together with the space within the hollow of screw 17 about spring 21 and nuts 22. When the compression pressure of the air in the compression ignited or spark plug ignited, adaptations of my invention, between the juxtaposed heads of said pistons 2, 64, becomes of the requisite magnitude, determined by the pressure exerted upon the skirt face of the supplemental piston 2, the piston 2 is, by the greater magnitude of the compression pressure moved outward a distance proportionate to such pressure. The disc 14 and its stem 12 are held stationary by screw 17. Such movement of said piston 2 and its projection 10 subjects the fuel oil, especially in the passages 43, 44, to further pressure, by the sudden substantial lessening of the length of the space (passage 43) between the piston-like shoulders 15, 15b, and a like lessening of the space (passage 44) between the like shoulders 15a, 15c, and which further pressure is initially contributed to by the smallness of opening 42, precluding any substantial outward movement of the fuel oil. During this movement of said piston 2 and its projection 10 relative to tubular stem 12, the shoulder 15b of said projection 10 will overlap the piston-like shoulder 15a on said stem 12, after which there can be no further outward movement of fuel from said passage 44, and further movement of said piston 2 and its projection 10 increases the pressure of the fuel oil in passageways 32 and 44. This overlapping of shoulders 15b, 15a, also seals the injectable portion of the fuel supply in passageways 32 and 44 from commnication with the fuel supply in passageways 43 and 41 while valve 20 may be open. When the pressure of fuel oil in passageway 32 against valve 20 is of such magnitude that it overcomes the outward pressure of spring 21 upon rod 18 and the like pressure of the compressed air between the pistons 2, 64, upon the inner surface of valve 20, the valve 20 opens and the fuel oil passing through the helical grooves at 19 is injected in a whirling spray into the compressed air between the pistons 2, 64, and commences to ignite. This combustion increases the compression pressure and temperature, which proportionately increases the movement of the supplemental piston 2 and its projection 10, which brings the piston-like shoulders 15a, 15c closer together and forces more fuel oil through passages 45, 32, to be likewise injected into and augment the combustion. The resulting receding of power piston 64 from supplemental piston 2 lowers the pressure upon the inward surface of piston 2 until the same is returned to normal position with the projection 5 of its skirt 1 resting against the inner shoulder of the enlarged bore 8 of supplemental cylinder 4 for supplemental piston 2. In assuming the normal position piston 2 is cushioned to a shockless contact of the projection 5 and shoulder by the compression of air therebetween and into recess 7, Fig. 1, in the skirt of piston 2 at the inner edge of said projection 5.

During the interval between compression strokes the fuel oil pressure is such that, notwithstanding the smallness of its above-described passageways, there is always an ample supply for injection in the injector assembly 12.

In my present invention the fuel oil pressure, in the fuel supply system, apart from that between the piston-like shoulders 15, 15b and 15a, 15c may be, and preferably is, maintained at a pressure substantially below the pressure required to inject the same into the cylinder 25, since the piston-like shoulders afford the intermediate fuel space wherein the additional pressure is built up by the relative movement of the shoulders toward each other by the force of the compression which is required for such injection at the proper time, without the necessity of cam action or power other than the compression which moves supplemental piston 2 proportional to the magnitude of such compression and thereby varies the extent of said relative movement as well as the volume of fuel injected proportional to such compression.

The fuel oil, in the instance disclosed, is stored in tank 33, Fig. 4, from whence it may flow through cut-off valve 34, thence through pipe 34a into strainer 35, thence through pipe 35a to the intake side of the initial compression stage of multiple stage pump 36, thence from the outlet side thereof through pipe 36a to the intake side of the ultimate stage of said pump, thence from the outlet side of said last stated stage through pipe 36b to its entrance to manifold 31, secured by screws 74 (Fig. 1) and gasket 30 to a surface of head 16 (Fig. 4, lower cylinder), thence to passageways 37 and 37a in manifold 31. These passageways 37 and 37a for each cylinder 25 employed in the engine have intermediate them a manual control valve 47, Figs. 1 and 5, for varying the fuel oil supply from nothing to maximum to each cylinder 25. Passageway 37a registers with the aforesaid passageways 37 of the manifold 31 of each cylinder 25 forming the unitary engine. From one of the manifolds 31, Figs. 1 and 4, a pipe 46a leads from a passageway 37 to a fuel relief return valve 46, Fig. 4, which may be set to open, in the compression ignited adaptation of my invention, for instance at 250 pounds per square inch of fuel oil pressure, and when so open surplus fuel therefrom flows back into tank 33 until valve 46 automatically closes in order to maintain the pressure in the fuel system between pipes 36b and 46a at substantially 250 pounds pressure, or at any other pressure which valve 46 may be set to maintain. I preferably place valve 46 at substantially the highest point in the fuel oil system to enable any air therein to accumulate thereat and flow therefrom into tank 33 whenever valve 46 may be open. Pump 36 is driven, in the instance shown in Fig. 4, by a worm gear 73 on its shaft 36c meshing with a worm gear 72 on crank shaft 65. The capacity of pump 36 exceeds the maximum required injection capacity in order to provide an ample supply of fuel oil at each injection point and to obtain the circulation of the excess fuel oil supplied by pump 36 through pipe 36b, the interconnected manifolds 31 of each cylinder 25, pipe 46a and valve 46 to tank 33. Some of the fuel oil seeps onto and lubricates the sliding surface of stem 12 and rod 18, as well as between the bore of projection 10 of piston 2, and the exterior surface of stem 12 at opposite ends of the passages 43, 44, and also enters annular oil collecting opening 69 (Figs. 1, 2) in each piston 2 surrounding its said tubular projection 10, from which opening 69 extends oil passage 70 to supply lubricant to each supplemental piston 2.

In Fig. 4 is also diagrammatically illustrated the adaptation of my invention to a typical double row of radial stationary cylinders 25, each row served by a separate crank on crank shaft 65. Merely portions of two cylinders 25 of such engine are shown, but those skilled in this art will readily understand, from what is disclosed, that the same pertains to such typical type of engine.

The means for maintaining the requisite or other inert fluid pressure to the skirt end of each supplemental piston 2 will now be described.

Each supplemental piston 2, one for each power piston 64 provided in the engine, is sealed in its bore 4 by head 16, which is provided with lateral passageway 55 passing through the gasket 30, Fig. 1, and enters the bore 11, through head 16, in the space which surrounds the reduced screw threaded end 75 of projection 10 of each of the pistons 2, when in the normal position, where the pressure of the air supplied by passageway 55 exerts an inward thrust upon the end of projection 10, and is confined from undesired escape from the bore by disc 14. Air or inert fluid under the required pressure is supplied the passageway 55 by means hereinafter described. The air pressure supplied the portion of bore 10, via 55, is led therefrom by passage-way 56 extending at a downward angle from the bore 11 through head 16 to exert its pressure directly upon the skirt end of piston 2. When the piston 2 is moved outwardly, as aforesaid, the end of its projection 10 closes the air passages 55, 56 to and from the bore 11 of head 16 by the corresponding movement of the projection 10 in the bore 11. The further movement of the part 2, 10 further compresses the air, thus sealed, against piston 2 and the end of projection 10, and the combined force of such two simultaneous compressions resists the movement of supplemental piston 2 and its projection 10 until the compression of power piston 64 against the head of the piston 2 overcomes the fixed resistance to movement of the supplemental piston 2 afforded by the air pressure on the opposite end of the supplemental piston 2.

In order to increase the efficiency and pressure of air upon the skirt end of piston 2, I provide head 16 with a cylindrical projection 16a extending into and slidably fitting and partially filling the interior of the skirt 1 of supplemental piston 2, leaving a space 49 (Fig. 1) (slightly exceeding in length the maximum extent of movement of said piston 2) between the projection 16a and the bottom of skirt of the piston 2, there being also a space 48 between the end of the skirt of the piston 2 and the corresponding opposite surface of head 16. In the normal position of supplemental piston 2, shown in Fig. 1, the exterior of projection 16a is provided with a vertical groove 1a, Figs. 1, 2, which, in the normal position, extends from the outlet of air passage-way 56, in the opposite side of projection 16a, to slightly below the end of the projection 16a, so that compressed air from 56 may partly enter the compression space 48 and the remainder enter the space 49 via 1a. Upon the outward movement of supplemental piston 2 the outer portion of its skirt adjacent the outer terminus of groove 1a acts as a valve which seals, Fig. 2, the compressed air separately in the spaces 48 and 49, and such sealed air is further compressed therein proportionate to the extent of movement of piston 2. This lessens the volume of compressed air resisting the movement of said piston 2 and results in greater compression of, and hence higher such resistance afforded by, the smaller volume of air.

The means for supplying compressed air to passageway 55, in the instance disclosed in Fig. 4, comprises an air compressor body 50, whose lower end is screwed into support 50a, and whose piston 61 bears on cam 71 driven by crank shaft 65. By screwing compressor body 50 toward or away from cam 71 the piston compression space, and hence compression ratio, of the compressor may be varied. Pipe 50b leads from the compressor 50 via the lower portion of stop valve 52 to accumulator tank 51, thence through the upper portion of stop valve 52, as shown by arrows, through pipe 52a to and through the three-way pressure regulator valve 53, which may be variably set as to pressure by the manual operation of lever 53a, thence through pipe 53b to one branch of a leading over check valve 57a (to one of whose other branches is connected a pump 57 operable by handle 57b) thence through the third branch of the valve 57a to pipe 57c and into passage-way 54 in manifold 31, and thence into passageway 55 whose entrance may be controlled in whole or in part by the shut-off valve 63, Fig. 4. Pipes 54a connect the air passageways 54 in the several manifolds 31 comprising one such manifold for each cylinder 25 of the engine.

The valves 47, 63 for each power cylinder 25 also enable the fuel and air respectively to be shut off to any one or more of said cylinders 25 for any reason including repairs, and in multiple cylindered engines having stationary cylinders the injector hollow valve stem 12 of any cylinder 25 of the engine may be removed for cleaning or repairs while the engine is in operation without the power producing functioning of the remaining cylinders 25 being affected by such removal.

It will be noted in Figs. 1B, 3 and 4, that the final compression space is within the bore 4 of cylinder 25a from which its supplemental piston 2 has been moved outward. Such compression space is located in the two cycle type of engine, outwardly from the cylinder ports 25b, 25c, Fig. 1B.

The head of power piston 64, Fig. 1B, is provided with an annular tapering outer edge portion 64b, while the corresponding wall portion 66 of power cylinder 25 is correspondingly tapered. The wall 4 of the cylinder 25a of supplemental piston 2 (which may be made integral with power cylinder 25) extends outwardly from the outer end of the tapering wall portion 66 of power cylinder 25, while the portion of the head of power piston 64, opposite the mouth of the wall 4 of the cylinder 25a may be flat, as shown in Fig. 1B.

In Fig. 1A, diagrammatically illustrating an adaptation of my invention to the valve-in-the-head type of four cycle engine, it will be noted that, in the instance therein shown, the mainly straight head of the power piston 64 in its outermost position extends, with slight clearance, into the head 16a of power cylinder 25, and that the head of power piston 64 is provided with a slight beveled portion 64d adjacent the head of its supplemental piston 2 which, in the instance, extends at an angle to the piston 64. This angular position of said piston 2 enables the aforesaid inlet and outlet valves and their stems to be in longitudinal parallelism with piston 64. This arrangement also enables a small compression space to be maintained in the outermost position of power piston 64 and the juxtaposed surfaces 66a, 64d, of head 16a and the head of the piston 2 in its innermost position, while the major compression space will be in the displacement of the piston 2 on the outer limit of the compression stroke of the piston 64. It wil also be noted that the inlet air passage 65f and the exhaust outlet passage 65g lead respectively to the inlet and exhaust valves of the four cycle engine; that the supplemental pistons 2 in the adaptation thereof illustrated are not operatively connected together and are not operated by or connected to the crank shaft 65 or other driven part of the engine, consequently, the power required to operate each supplemental piston 2 cannot diminish the power output of the engine. Consequently, the power required to bring the fuel oil from its normal pressure up to its injection pressure, as well as the injection thereof, afforded by the supplemental piston 2 opposite each power cylinder 25, is no part of the power output of the engine. The air or fluid pressure normally supplied to said opening 54 of manifold 31 is less than required to control the outward movement of each supplemental piston 2, which movement builds up the required abnormal pressure in said spaces 48, 49, likewise without detracting from the power output of the engine. These are further distinguishing functions and advantages of engines equipped with my present invention.

Some of the advantages of my present invention may be more fully appreciated when it is understood that in the event oil is used as fuel the maximum engine compression at the time of the commencement of fuel injection into such compressed air must be not less than substantially 450 pounds per square inch in order that the temperature associated with such compression shall be sufficient to initially ignite the fuel injected. Such combustion increases such temperature and the corresponding compression to as high as about 1000 pounds per square inch. With my present invention the relief valve 46, of the fuel oil supply system, need be set at only about 250 pounds per square inch of gauge pressure, with corresponding pressure in passageways 38 and 41. The compression pressure in each of the power cylinders of the engine exerted upon their respective supplemental pistons 2, by the means heretofore described, augments the fuel oil pressure at a point beyond each passage-way 43 to the required degree above the compression pressure in the cylinders 25 to commence and continue to inject such fuel against such compression. The air pressure within passages 55, 56 need be but about 225 pounds per square inch gauge pressure for full power engine operation, while the means heretofore described (for supplying such air to, and cutting the same off from the compression spaces 48, 49 acting upon each supplemental piston 2 to counteract the various stages of compression attained by the respective power pistons) employs such piston 64 compression to augment to the required degree the counteracting pressures on the opposing side of each of the respective supplemental pistons 2. It will be appreciated that these substantially lower pressures of fuel oil and of air required to be maintained during engine operation in their supply systems up to each cylinder 25 require less duty upon their several compressors or pumps and less strength and weight, as well as longer wear, of the several units of each of such systems. It will be further appreciated that the high pressures of fuel oil and of air are extremely localized in limited areas at each cylinder 25 where the same are solely required, and that such localization of the fuel oil is at a pressure and temperature which will ignite such fuel oil, if the oxygen requisite for combustion be present, and that such high pressure fuel is separated from the low pressure fuel, by the extent of the sliding fit between shoulders 15a and 15b, before such higher pressure is commenced, and that low pressure fuel is supplied to such higher compression areas until its exit has been sealed to the combustion chambers of the several cylinders, in which combustion may be occurring.

It will be appreciated that the extreme high pressure applied to the fuel only in the fuel discharge passage-ways 32, 44 and 45 causes a portion of the fuel therein to be progressively injected therefrom helically at high velocity in a hollow cone which is injected a substantial distance into the combustion chamber 67 via the helical grooves 19 and atomizer valve-disc 20 in a whirling, minutely atomized spray. This progressively forms an intimate mixture of the fuel and the extremely hot and turbulent air that during compression is being violently displaced from the bore 66 of power engine cylinder 25 into the ultimate compression space of each cylinder 25, afforded by the displacement of its supplemental piston 2. This progressive mixture causes rapid flame propagation well distributed through the area between pistons 2, 64, insuring complete combustion and its conversion into useful work before the products of such combustions are exhausted. Under full power operating conditions the pressure of the air on opposite faces of each supplemental piston 2 may, in the aforesaid instance, be about 450 pounds per square inch, when the moving elements of the engine have reached the position of travel illustrated in Fig. 2, and about 1000 pounds per square inch after combustion has started and said moving elements have reached the position of travel illustrated in Fig. 3.

In order to decrease or increase the power being developed by the engine, the quantity of fuel per injection charge is respectively decreased by increasing, and increased by decreasing, the pressure of the air in the manifold 54. This variable air pressure in the manifold directly affects the length of stroke of the supplemental piston 2. The lever of control valve 53 (Fig. 4) has three positions, the vent or engine accelerating position wherein pressure is reduced in manifold 54 by leak off to the atmosphere via vent hole 58 in said valve, the hold or engine steady position wherein passage of air through said valve is cut off and any engine speed can be maintained, and the supply or the engine decelerating position wherein air is supplied to manifold 54 and in which position the engine can be slowed down or stopped depending upon pressure of air admitted to said manifold and the relative restriction of travel of pistons 2. A high air pressure of approximately 250 pounds on the manifold 54 is sufficient to prevent required travel of pistons 2 to produce fuel injection and hence stops the engine, while a low air pressure of approximately 200 pounds on the manifold allows maximum travel of the pistons 2 and results in maximum fuel injection, and hence maximum engine power.

Assuming that the tension of the fuel atomizer valve retainer spring 21 is such as to retain the atomizer valve-disc 20 in contact with its seat when having the normal fuel supply pressure in chamber 43, in the absence of compression from 64 on the inward surface of valve-disc 20 and with the moving elements of the engine in the position illustrated in Fig. 1, and that the cross-sectional area of the annular shaped fuel discharge space 32 is one-fifth of the cross sectional area of the largest diameter of the atomizer valve-disc 20, then the pressure per square inch on the fuel in said fuel discharge space 32 may, by the structure described, be approximately five times the compression and/or the combustion pressure per square inch on the inward surface of the disc 20 during the fuel injection period of operation of the engine.

The projection 16a of each head 16 extending through compression space 48 and into such space 49 of its respective piston 2 facilitates the transfer of surplus working heat from such spaces to the atmosphere.

The structure herein disclosed may be advantageously employed in spark plug ignited engines by employing in tank 33, or other source of supply, gasoline or fuel gas, in which case the fuel pressure control valve 46 is set to a reduced pressure which will insure such fuel supply to each cylinder 25, the air pump casing 50 is then adjusted outward from cam 71 to decrease the compression space of piston 61 and the resulting air compression ratio and pressure supply to each compensating piston 2, and by supplying a spark plug 4a, diagrammatically shown typically in Figs. 1A, 1B, to which is connected its usual wiring, timing and other ignition supply means, in which case the volume of the space between the heads of such pistons 2 and 64 is of such magnitude as to afford only the normal compression of the spark plug ignited type of engine, the spark plug 4a being, in such adaptation, adapted to ignite the commingled air and fuel slightly before pistons 2, 64, have reached their maximum outward stroke.

It will be understood by those skilled in this art from the foregoing that in the adaptation of my invention to the spark plug ignited type of engine the spark plug 4a, diagrammatically indicated in Figs. 1A, 1B, may be connected to a common type of high tension ignition spark timing means having a vibrating interrupter in the primary circuit thereof and whereby such spark may continue throughout the latter portion of the outward travel of its respective piston 2; that the injection of the fuel into the compressed air of the spark plug ignited type of engine affords an intimate highly efficient mixture of the air and fuel at the time its flame propagation has been initiated by the action of such spark at plug 4a. This is due to the fuel being injected into the substantially heated volume of the air compressed, and correspondingly heated, by each power piston 64 to a degree which may approximate or exceed the compression practiced with spark plug ignited combustion engines. Due to such heat at the time of such injection of the fuel (gas or gasoline) the latent heat of evaporation of the gasoline will not lower the temperature of the air, with which the same is mixed, sufficiently to afford crank case dilution, or an inefficient mixture.

It is also notable that, in such adaptation, only a small part, if any, of the pressure required of the air, and fuel is supplied by and subtracted from the power output of the engine constructed in accordance with my invention, while the work required for the major pressures of the air and fuel is afforded by the supplemental piston 2 which does not diminish the power output of the engine.

It will be appreciated by those skilled in this art that the usual spark gap elements of the conventional spark plug 4a, Figs. 1A, 1B, being maintained by supplemental piston 2 free from the combustion constituents until the same is under substantial pressure from power piston 64 and the fuel is injected into such air, insures a thorough efficient mixture of the air and fuel before the initiation of combustion in the same by a spark being formed in said spark gap elements. This produces a more uniform rate of combustion of the combustion constituents. The same also, with the fuel being injected only into the air in the cylinder while the same is subjected at least to a substantial part of the compression pressure, further precludes the wastage of the fuel and the impairment of the viscosity and lubricating efficiency of the lubricating oil by crank case dilution.

The invention described herein may be manufactured and used by or for the Government of the United States of America for governmental purposes without the payment of any royalties thereon or therefor.

Having fully described my invention, what I claim as new and desire to secure by Letters Patent is:

1. In association with an internal combustion engine, a liquid fuel atomizing and injecting assembly comprising in combination, a valve stem having a valve head to be exposed and open into the compression chamber of said engine, a stationary member surrounding said stem and having a small end adapted to be exposed in said chamber and serve as a seat for said valve head, also having a plurality of different sized plunger portions intermediate said small end and an opposite enlarged end portion, a movable member surrounding said stationary member and having a plurality of plunger chambers about said plunger portions, an oil cavity extending along and intermediate said stem and said stationary member near the enlarged end of the latter and having communication with a source of oil fuel supply and the larger of said plunger chambers, a second oil cavity extending along and intermediate said stem and said stationary member nearest the small end of the latter and having communication with the smaller of said plunger chambers, a resilient means retaining said valve head in contact with its seat, one end of said movable member being exposed to the pressure of said compression chamber whereby pressure in said compression chamber moves the movable member in relation to said stationary member to cut off communication between said oil cavities and entrap and compress oil fuel in said second oil cavity to thereby raise said valve head from its seat and inject some of said entrapped oil fuel into said compression chamber.

2. The apparatus of claim 1 characterized by a slidable joint extending along and formed between the outer diameter of said stem and the inner diameter of said stationary member and being adapted to separate said first and second mentioned oil cavities.

3. The apparatus of claim 1 characterized by a manually controlled pneumatic means connected to the other end of said movable member for regulating the length of travel of said movable member in relation to said stationary member and thereby regulating the quantity of entrapped fuel injected into said compression chamber.

4. An article of manufacture for the oil atomizing and injecting assemblies of internal combustion engines, consisting of a valve formed by a valve stem having a valve head adapted to be exposed and open into the usual compression chamber of such an engine, a stationary hollow plunger member surrounding said stem and having a small end adapted to be exposed in said chamber and serve as a seat for said valve head, and a bored movable member through which said valve stem and said stationary hollow plunger member extend, a plurality of unequal diameter cylindrical plunger portions integral with said stationary member and located intermediate said small end and an opposite enlarged end, an oil cavity extending along and intermediate said stem and said stationary member nearest the enlarged end of the latter and adapted to have communication with a source of fuel supply, a second oil cavity extending along and intermediate said stem and said stationary member nearest the small end of the latter, a chamber formed between said bored movable member and said stationary member intermediate said oil cavities, ports through said stationary member providing communication between said oil cavities via said chamber, said second oil cavity communicating with said valve, a resilient spring surrounding said stem and bearing against said member adjacent said enlarged end and adapted to yieldably retain said valve closed with said valve head in contact with its seat in said member, a closed cylinder communicating with the compression chamber, said bored movable member being located in said closed cylinder and exposed to the pressure within the compression chamber to urge said bored movable member in a direction away from the compression chamber, such movement diminishing said chamber intermediate said oil cavities and cutting off the communication therebetween and exposing said valve head to the compression chamber, the diminishing of said chamber forcing the oil in said second cavity to open and pass said valve to the compression chamber, a pneumatic chamber formed between the other end of said bored movable member and said closed cylinder and a remotely controlled pneumatic means communicating with said pneumatic chamber urging said bored movable member in the opposite direction to enlarge said chamber and close said valve.

5. In association with the power piston, cylinder and compression chamber of an internal combustion engine, a combustion pressure cushioning and compensating device and fuel injection device comprising in combination a compensating cylinder extending from the combustion engine cylinder, a compensating piston member movable in said compensating cylinder, a stepped hollow skirt extending centrally from said compensating piston member, a bore in said skirt extending through said compensating piston member, a bonnet member secured to said compensating cylinder, said bonnet having a bore into which said hollow skirt movably extends, a stepped hollow plunger member anchored at one end to said bonnet and interfittingly extending through said bore of said skirt and said compensating piston member and having a valve seat formed at its other end and adapted to be exposed to the compression chamber, a valve stem extending through said hollow plunger and having a valve head yieldably held in contact with said valve seat at one end by a spring resting against the anchored end of said hollow plunger, a plurality of fuel chambers formed by said hollow plunger member and said hollow skirt and valve stem, ports through said hollow plunger member, said ports interconnecting all of said chambers only while said skirt and compensating piston member are at the compression cylinder end of the compensating cylinder, one of said chambers being closed off to cut off communication between the remaining fuel chambers when said compensating piston member is moving away from the combustion chamber and entrap fuel oil in the fuel chamber nearest the combustion chamber to thereby force the oil against the valve head and open the valve to inject the oil into the combustion chamber, a fuel supply port extending through said bonnet from the source of fuel supply to a fuel chamber in said plunger member, means for cushioning the movement of said compensating piston member comprising a counterbore shoulder in said compensating cylinder and a circumferential shoulder on said compensating piston adapted to cooperate therewith in the direction of the compression chamber, port means in said bonnet connecting said compensating cylinder with a source of supply of compressed gaseous substance, and means for controlling the pressure from the source of supply of compressed gaseous substance through said port in said bonnet to said compensating cylinder to thereby control the movement of said compensating piston member and thus control the injection of fuel to the compression chamber.

6. The apparatus of claim 5 characterized by an annular recess in the vicinity of the base of said circumferential shoulder of said compensating piston forming a cushioning compression space for said piston.

7. The apparatus of claim 5 characterized by a cushioning means consisting of an annular recess formed in and concentric with said compensating piston in the end away from said compression chamber and adapted to receive a projecting portion of said bonnet and to thereby form two annular chambers, one in said recess intermediate the end of said projection and said compensating piston and the other outward of said projecting and adjoining said last mentioned piston.

8. In an internal combustion engine, the combination of an initial combustion pressure compensating cushioning means and an oil fuel atomizing and injecting means consisting of a movable compensating piston member adapted to be urged toward and to have an end exposed in the compression chamber of such engine, a compressed gaseous substance means at the opposite end of said piston resiliently and compensatingly retaining said piston toward the compression chamber, a plurality of unequal diameter cylindrical chambers intermediate said compression chamber end and the opposite end of said compensating piston, a liquid fuel atomizing and injecting unit mounted in said last mentioned chambers, a valve in said unit automatically operated by the movement of said compensating piston away from said compression chamber, means for supplying liquid fuel from a source of fuel supply to said injecting unit, means for supplying said gaseous substance from a source of supply to the side of said piston opposite from the compression chamber end, means for controlling the pressure on said gaseous substance being supplied to control the length of the stroke of said piston, whereby a predetermined pressure in said compression chamber moves said compensating piston in relation to said stationary unit to inject fuel into said compression chamber and the movement of said piston compensatingly cushions the pressure of combustion in said last mentioned chamber immediately following the injection of said fuel thereto.

9. In an internal combustion engine, the combination of an initial combustion pressure compensating cushioning means and a liquid fuel atomizing and injecting means consisting of a movable compensating piston member having a seat limiting its movement toward the combustion engine compression chamber and adapted to be urged toward and to have an end exposed in the compression chamber of such engine, said atomizing and injecting means including a fuel atomizing and injecting unit mounted in said piston member and operated by the movement of said piston member away from said compression chamber, means for supplying fuel to said injecting unit, means in the form of compressed gaseous substance on the opposite side of said piston from the compression chamber for resiliently and compensatingly retaining said piston seated, means for supplying said gaseous substance to said compression chamber side of said piston, and means for controlling the pressure on said substance being supplied.

10. In an internal combustion engine having a compression chamber formed by a power cylinder and having a power piston operable within the compression chamber, a supplementary cylinder connected to and extending from the compression chamber, a seat formed in the wall of said extended cylinder, a piston movable within said extended cylinder, a seat on said piston cooperating with said seat of said cylinder limiting the movement of said second piston toward said compression chamber, a bonnet secured to said extended supplementary cylinder forming a compression chamber between said second piston and said bonnet, a bore extending through said bonnet, a valved fuel injector extending through said bonnet bore, a skirt extending from said second piston into said bonnet bore, a bore extending through said skirt and said second piston, a hollow sleeve member anchored in said bonnet and extending through said skirt and second piston bore, a stem extending through said hollow sleeve member and yieldably anchored thereto, a valve comprising a valve seat formed on the second piston end of said hollow sleeve member, and a valve head on said stem adapted to close against said valve seat, means in said second piston compression chamber cushioning the movement of said second piston, said second piston exposing said valve to said first compression chamber when the compression in the first compression chamber exceeds the pressure in the second compression chamber to move said second piston away from said first compression chamber.

FRANK DAVID BUTLER.